UNITED STATES PATENT OFFICE.

WALDEMAR THILMANY, OF CLEVELAND, OHIO.

IMPROVEMENT IN PROCESSES FOR PRESERVING TIMBER.

Specification forming part of Letters Patent No. 202,678, dated April 23, 1878; application filed May 17, 1877.

*To all whom it may concern:*

Be it known that I, WALDEMAR THILMANY, of Cleveland, in the county of Cuyahoga and State of Ohio, have invented an Improvement in Preserving Timber, of which the following is a specification:

It is well known to practical men that the barium-copper process of preserving timber is objectionable, because the sulphate of copper will not easily penetrate some kinds of wood, and chloride of copper will corrode spikes, bolts, and other iron often used in wooden structures. After many years of experiment I have remedied these and other difficulties.

My invention consists of saturating timber with solutions of sulphate of zinc and chloride of barium. By this treatment, and the consequent chemical reactions within the wood, the latter is charged with chloride of zinc, which unites with the albuminous tissues of the wood, and becomes fixed therein, also becomes consolidated with the sulphate of baryta.

My experiments have shown that the chloride of zinc is the chief preservative agent, while the sulphate of baryta is the retentive agent.

My process or treatment of wood is as follows: The solution of sulphate of zinc may be made by dissolving, say, about six pounds of sulphate of zinc in fifteen gallons of water; and the solution of the chloride of barium may be made by dissolving four pounds of chloride of barium in fifteen gallons of water. The timber may be placed in a strong iron cylinder, which is afterward closed, and then steam admitted thereto, for the purpose of expelling the sap and uniformly moistening the timber. Then a vacuum is produced in the cylinder, in order to exhaust the air from the timber, and thus prepare the latter to receive the chemical solutions. Then the solution of sulphate of zinc is introduced into the cylinder and forced into the pores or cells of the wood by means of a powerful hydraulic pressure, which may be continued from two to ten hours, according to the size of the sticks of timber. After the timber is thus charged with sulphate of zinc the residual solution is drawn from the cylinder, which is then charged with the solution of chloride of barium, and the latter is forced into the timber by the same heavy pressure, which is also continued, as above mentioned.

Instead of this method, the timber may be charged by means of the well-known hydrostatic process, or by soaking in open tanks, or by other known methods.

By the above chemical treatment I obtain the double decomposition of the salts within the pores of the wood, which are thus filled with a mixture of chloride of zinc and sulphate of baryta, completely preventing rot and decay, and also preventing ship-worms and other parasites from eating the timber. The chemical affinity and the mechanical mixture are such that a portion of the chloride of zinc and the whole of sulphate of baryta have become consolidated in the pores of the wood, and cannot afterward be separated or extracted by long exposure to air or water. This treatment is much better than the common copper treatment.

An important advantage of my process is the saving of expense, as I can use iron cylinders or vessels, while the copper process requires very expensive copper apparatus.

The timber may be first charged with chloride of barium and afterward with sulphate of zinc; but I do not recommend this method.

Having described my invention, I claim—

The above-described process of preserving wood by saturating the fibers of timber by treatment with solutions of sulphate of zinc and chloride of barium, substantially in the manner set forth.

WALDEMAR THILMANY.

Witnesses:
   J. H. BURRIDGE,
   C. D. MERRY.